Jan. 28, 1947.  C. NYGREN  2,415,033
CENTRIFUGAL FAN
Filed May 1, 1944
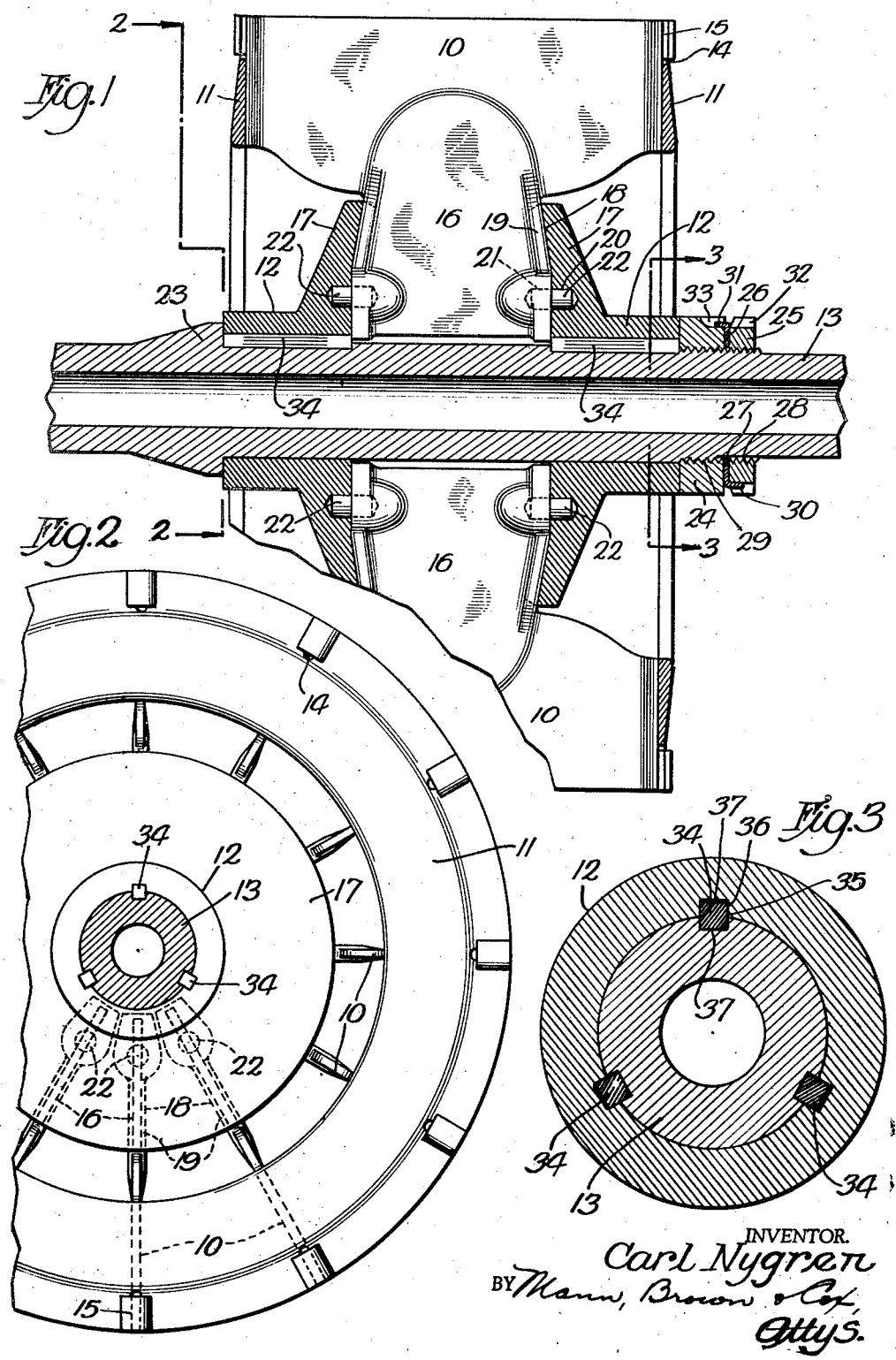
INVENTOR.
Carl Nygren
BY Mann, Brown & Cox
Attys.

Patented Jan. 28, 1947

2,415,033

UNITED STATES PATENT OFFICE 2,415,033

CENTRIFUGAL FAN

Carl Nygren, Michigan City, Ind., assignor to Michiana Products Corporation, Michigan City, Ind., a corporation of Indiana Application May 1, 1944, Serial No. 533,456

3 Claims. (Cl. 230—134)

A centrifugal fan for operation in an atmosphere of high temperature on the order of 1600° Fahrenheit, or more, may run in excess of 1,000 revolutions per minute; and, with a diameter on the order of 30 inches, it may weigh on the order of 650 pounds, according to the design and the alloy. From this, it must have dynamic balance; that is, the weight must be so uniformly distributed that all forces of energy are in balance while the fan is in rotation. The fan must have dynamic balance, or it will shake itself to pieces within a short period of service.

Shafts for such fans are preferably made of carbon steel having a different coefficient of expansion from the alloy steel hubs or hub members and other parts; and the shafts are usually water cooled. The unavoidable result is great difference in expansion which an ordinary driving connection, such as a single key, works into eccentricity and throws the whole out of dynamic balance and sets up destructive forces.

The principal object of this invention is to provide a driving connection between such shafts and hub members that will preserve dynamic balance in spite of great differences in expansion. Generally speaking, this is accomplished by centering the hub members on the shafts with, and driving them through, several (three or more) equally spaced keys or splines closely fitted at the sides.

In the accompanying drawing showing a selected embodiment of the invention—

Fig. 1 is an axial cross-section through a centrifugal fan wheel;

Fig. 2 is a section taken on the line 2—2 of Fig. 1; and

Fig. 3 is a section taken on the line 3—3 of Fig. 1.

But this particular drawing corresponding to the more full disclosure in my copending application Ser. No. 536,801, filed May 22, 1944, now matured into Patent No. 2,385,837, October 2, 1945, are chosen for the purpose of disclosure only and are not intended to impose unnecessary limitations on the claims.

The fan illustrated is composed of twelve blades 10, two circular shrouds 11, two hub members 12, and a hollow water cooled shaft 13. The shrouds have open ended slots 14 receiving projections 15 at each side of each blade 10 by which the several blades and shrouds are interlocked for supporting and driving the shrouds, but leaving them free to expand and contract relative to the blades.

The inner portions 16 of the blades are of somewhat dovetailed shape axially, and are supported by and clamped between flanges 17 on the hub members 12 having slots 18 which receive the machined edges 19 of the blades with minute clearance. The flanges 17 and the inner portions of the blades 16 are provided with aligned openings 20 and 21 which receive dowel pins 22 for making the blades fast to the hub members and holding them against bodily outward movement individually, while the slots 18 enable the outer portions of the flanges 17 to embrace the inner portions of the blades 16 and hold them against any relative rotation with respect to the hub members.

The shaft 13 has an integral collar or shoulder 23 at the left against which the left hub member 12 is seated. The right hub member 12 is limited in its movement by a locking collar 24, which, in turn, is locked in adjusted position by a lock nut 25 and a lock washer 26, the latter having a tab 27 projecting into a keyway 28 in the threaded part 29 of the shaft 13, and other tabs 30 and 31 which are bent into notches 32 and 33 in the lock nut and locking collar respectively.

Each of the hub members is centered on the shaft and connected with it for driving by three keys 34, preferably fitted closely at the sides 35 only, whereby the centering and driving are effected by the contact between the sides 35 and the cooperating sides 36 of the key slots 37 in the hub members and the shaft. Preferably, these keys are arranged at equal distances around a circle or at 120° on centers. In a 30-inch fan weighing on the order of 650 pounds, the keys are ¾" x ⅝". They are made of the same steel as the shaft.

Four keys at 90° apart, etc., may be used, but for simplicity three keys alone have been illustrated.

Some will prefer to use integral splines, in which case the same number may be used and may be formed by broaching to fit at the sides only, or at least to fit with the least clearance at the sides only. Integral splines have the advantage that, in case manufacturing tolerances or some other cause makes clearance possible, there is no tilting.

It will be apparent that with either keys or splines, as described, the close fitting of the sides thereof with the sides of the slots unavoidably effects centering of the hub members with respect to the shaft and maintains that centering in service irrespective of the differential expansion that may result from the different coefficients of expansion and from the differences in temperature of the parts.

While the hub members can be fastened to the shaft against endwise movement in many ways, it has been found preferable to use a fixed shoulder 23 at one end and an adjustable locking collar 24 at the other end, which can be set to allow for a calculated expansion of the hub members and blades with respect to the shaft and locked firmly in that position by the lock nut 25 and the lock washer 26, as described. This has the advantage of allowing the fan to heat up and cool down under the varying conditions of service without developing a looseness at normal working temperature that would affect its durability.

For simplicity, the term "key" is used to designate separate keys and integral splines.

I claim:

1. In a centrifugal fan, a wheel structure including a plurality of blades and a hub member for supporting the blades, a shaft through the hub member, and at least three equally spaced keys, each having parallel side faces and radial clearance and each being of substantially uniform radial thickness throughout its length, centering the hub member on the shaft with their side faces only and forming a driving connection between them.

2. In a centrifugal fan, a plurality of blades, a pair of hub members supporting the blades, a shaft passing through the hub members, at least three equidistantly spaced keys, each having parallel side faces and radial clearance and each being of substantially uniform radial thickness throughout its length, centering the hub members on the shaft and forming a driving connection between them, a shoulder on the shaft for one of the hub members, a collar on the shaft adjustable with respect to the other hub member, and means for locking the collar in adjusted position.

3. In a centrifugal fan, a wheel structure including a plurality of blades, a hub member for supporting the blades, and a shaft through the hub member, at least three equally spaced keys, each having parallel side faces and radial clearance and each being of substantially uniform radial thickness throughout its length, centering the hub on the shaft and forming a driving connection between them, a collar for limiting movement of the hub member with respect to the shaft in one direction, an adjustable collar for limiting movement of the hub member on the shaft with respect to the shaft in the other direction, and means for locking the collar in adjusted position.

CARL NYGREN.